United States Patent [19]
Raychaudhuri et al.

[11] Patent Number: 6,023,461
[45] Date of Patent: Feb. 8, 2000

[54] HANDOFF METHOD FOR AN ATM WIRELESS NETWORK WHEREIN BOTH THE SWITCH AND THE MOBILE BUFFER CELLS AND THE MOBILE CONTROLS WHEN THE HANDOFF WILL OCCUR

[75] Inventors: Dipankar Raychaudhuri, Princeton; Jun Li, Piscataway; Arup Acharya, N. Brunswick, all of N.J.

[73] Assignee: NEC USA, Inc., Princeton, N.J.

[21] Appl. No.: 08/948,612

[22] Filed: Oct. 10, 1997

[51] Int. Cl.[7] .............................. H04Q 7/00; H04L 12/28; H04L 12/56
[52] U.S. Cl. .......................... 370/331; 370/395; 455/436
[58] Field of Search ................................. 370/331, 395, 370/400, 401, 312; 455/436, 437

[56] References Cited

U.S. PATENT DOCUMENTS

| | | | |
|---|---|---|---|
| 5,420,863 | 5/1995 | Taketsugu et al. | 370/95.3 |
| 5,434,853 | 7/1995 | Hemmady et al. | 370/60 |
| 5,638,371 | 6/1997 | Raychaudhuri et al. | 370/347 |
| 5,684,791 | 11/1997 | Raychaudhuri et al. | 370/278 |
| 5,896,373 | 4/1999 | Mitts et al. | 370/331 |
| 5,940,371 | 8/1999 | Mitts et al. | 370/236 |
| 5,940,381 | 8/1999 | Freeburg et al. | 370/331 |

OTHER PUBLICATIONS

M. Marsan et al.; "Buffer Requirements for Loss–Free Handovers in Wireless ATM Networks"; Torino—Italy; Proceedings of 3rd IEEE ATM Workshop; May 1997; 10 pages.

R. Izamailov et al.; "An Architecture for Lossless Service on a Packet Switched"; C&C Research Laboratory, NEC USA, New Jersey; IEEE 1996; 5 pages.

H. Mitts et al.; "Lossless Handover for Wireless ATM"; ACM/Baltzer Mobile Networks and Applications; Dec. 1996; pp. 85–96.

P. Narasimhan et al.; "Design and Performance of Radio Access Protocols in WATMnet, a Prototype Wireless ATM Network"; C&C Research Labs, NEC USA, Inc., New Jersey; 10 pages.

Cesar A. Johnston; "A Network Interface Card for Wireless ATM Networks"; Proceedings of IEEE PIMRC; 1996; 5 pages.

D. Raychaudhuri; "Wireless ATM Networks: Architecture, System Design and Prototyping"; NEC USA, C&C Research Laboratories, New Jersey; IEEE ComSon Personal Communications Magazine (Invited); pp. 1–19.

R. Yuan et al.; A Signaling and Control Architecture for Mobility Support in Wireless ATM Networks; Proceedings of IEEE; 1996; pp. 478–484.

A. Acharya et al.; "Primitives for Location Management and Handoff in Mobile ATM Networks"; ATM Forum Technical Committee; Aug. 19–23, 1996; 16 pages.

D. Raychaudhuri et al.; ATM Based Transport Architecture for Multiservices Wireless Personal Communication Networks; IEEE JSAC Issue on Wireless & Mobile; Oct. 1994.

*Primary Examiner*—Douglas W. Olms
*Assistant Examiner*—David R Vincent
*Attorney, Agent, or Firm*—Sughrue, Mion, Zinn, MacPeak & Seas, PLLC

[57] ABSTRACT

A handoff control process in a wireless ATM network replaces an old communications connection with a new communication connection. In order to guarantee that no data is lost during the replacement process, an ATM cell level mechanism is used to re-schedule the buffering and transmitting of data streams of the virtual channels (VCs) to be handed-off. In addition, this mechanism is transparent to user applications. The present invention performs three fundamental cell level scheduling functions. The first function is to mark and redirect cell transmission with operation and maintenance (OAM) cells. The second function is to disable and buffer cell transmission until the new path is connected. The third function is to enable cell transmission, starting with the buffered cells across the connected new path.

14 Claims, 10 Drawing Sheets

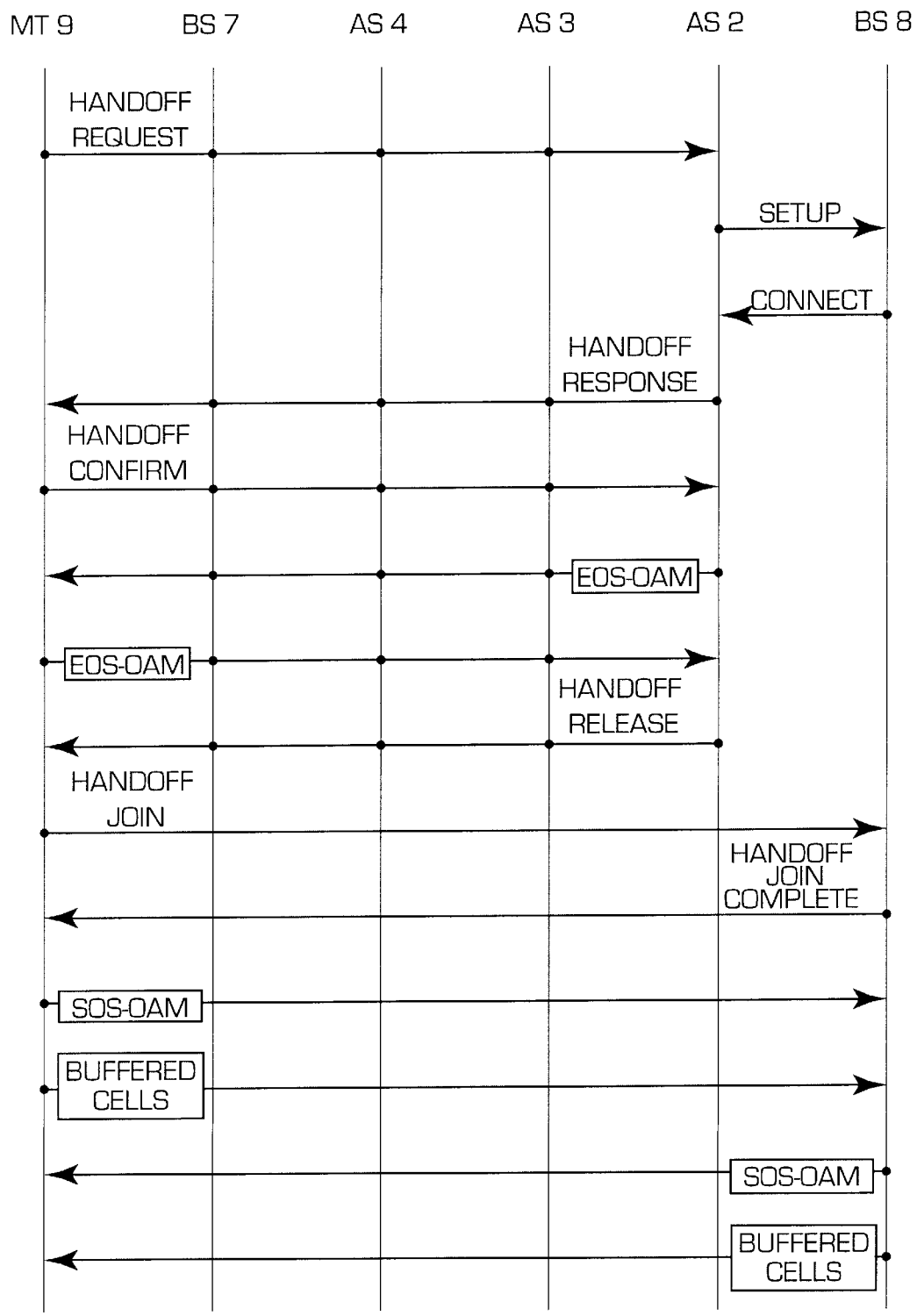

HANDOFF METHOD FOR AN ATM WIRELESS NETWORK WHEREIN BOTH THE SWITCH AND THE MOBILE BUFFER CELLS AND THE MOBILE CONTROLS WHEN THE HANDOFF WILL OCCUR

BACKGROUND OF THE INVENTION

1. Field of Invention

The present invention relates to a signaling framework for supporting mobile terminals in a wireless asynchronous transfer mode (ATM) network. Specifically, the invention refers to control protocols for handoff between base stations and mobile terminals.

2. Background and Description of Related Art

The rapid worldwide growth of digital wireless communication services has led to a new generation of mobile switching networks to serve as infrastructure for such services. Given the wide range of radio access technologies being employed for both telephone and Internet access, new mobile switching architectures are needed to provide generic, cost-effective support for a variety of cellular and wireless data technologies. In addition, mobile networks being deployed in the near future should be capable of smooth migration to future broadband services based on high-speed wireless access technologies, such as wireless ATM.

The basic idea of wireless ATM is to use a standard ATM cell for network level functions, while adding a wireless header/trailer on the radio link for wireless channel specific protocol sublayers (medium access control, data link control and wireless network control). ATM virtual circuits with quality of service control are supported on an end-to-end basis via standard ATM signalling functions which are terminated at the mobile unit. Terminal migration related functions such as handoff control and location management are handled by suitable mobility support extensions to ATM signalling/control protocols implemented at the radio port (base station) and switches within the fixed network.

A mobile ATM network offers several advantages over non-ATM networks. One advantage is that it provides a high-speed backbone network that provides a common infrastructure network to a diverse set of mobile technologies. A second advantage is that it offers mobility support to terminals, independent of the wireless access technology.

A basic architecture for wireless ATM networks in which broadband services are extended over shared radio channels, and which incorporates suitable medium access control and data link control layers into the standard ATM protocol stack, was proposed by D. Raychaudhuri and N. Wilson in an article entitled, ATM Based Transport Architecture for Multiservice Wireless Personal Communication Network, IEEE JSAC, October 1994. Additional information on mobile ATM networks was disclosed by D. Raychaudhuri in an article entitled, Wireless ATM Networks: Architecture, Systems Design and Prototyping, IEEE Personal Communications, August 1996. Both articles are incorporated herein by reference.

A wireless ATM system broadly consists of a radio access layer and a mobile ATM network. The radio access layer consists of several new protocol sublayers necessary to extend ATM services over a wireless link. The major functions of this layer include high-speed physical level transmission/reception, medium access control for channel sharing by multiple terminals, data link control for amelioration of radio channel impairments, and wireless control for radio resource management and metasignaling.

Mobile ATM is the term used to denote the set of enhancements needed to support terminal mobility within a fixed ATM network. The major functions of mobile ATM are location management, for mapping of user names to their current locations, and handoff control, for dynamic rerouting of virtual channels during terminal migration. Note that mobile ATM is intended to be independent of the specific radio access technology used. This means that in addition to supporting end-to-end wireless ATM services via the radio access layer, mobile ATM capabilities can be used to provide an interconnection infrastructure for existing personal communications systems (PCS), cellular and wireless LAN applications.

Medium access control is the subject of U.S. Pat. No. 5,638,371, entitled "Multiservices Medium Access Control Protocol for Wireless ATM System." Data link control is the subject of U.S. patent application Ser. No. 08/553,168, entitled "Data Link Protocols for Wireless ATM Access Channels." Handoff control is the subject of U.S. patent application Ser. No. 08/773,738, entitled "Handoff-Control Technique for Wireless ATM." The patent and two applications are assigned to the same assignee as the present invention and are all incorporated herein by reference.

One of the problems with the current design of mobile ATM networks is that data cells being transmitted to and from a mobile terminal can sometimes become lost, duplicated or placed out of order when the mobile terminal is handed off from one base station to another. Several aspects of this issue have been addressed in an article by H. Mitts et al., entitled "Lossless handover for wireless ATM, ACM/ Baltzer Mobile Networks and Applications, December 1996 and an article by M. Ajome Marsan, et al., entitled "Buffer Requirements for Loss-Free Handovers in Wireless ATM Networks, Proceedings of the 3rd IEEE ATM Workshop, May 1997.

The present invention provides a method whereby connections from a mobile terminal can be seamlessly re-rerouted from one base station to another without data loss, duplication or misordering of data.

SUMMARY OF THE INVENTION

The handoff control process of the present invention replaces an old communication connection with a new communication connection. In order to guarantee that no data is lost during the replacement process, an ATM cell level mechanism is used to re-schedule the buffering and transmission of data streams of the virtual channels (VCs) to be handed-off. In addition, this mechanism is transparent to user applications. The present invention performs three fundamental cell level scheduling functions.

The first function is to mark and redirect cell transmission with operation and maintenance (OAM) cells. The second function is to disable and buffer cell transmission until the new path is connected. The third function is to enable cell transmission, starting with the buffered cells across the connected new path.

BRIEF DESCRIPTION OF THE DRAWINGS

FIG. 5 describes the sequence of signals and cells in the handoff process of an alternate embodiment.

DESCRIPTION OF THE PREFERRED EMBODIMENT

Figure 1:
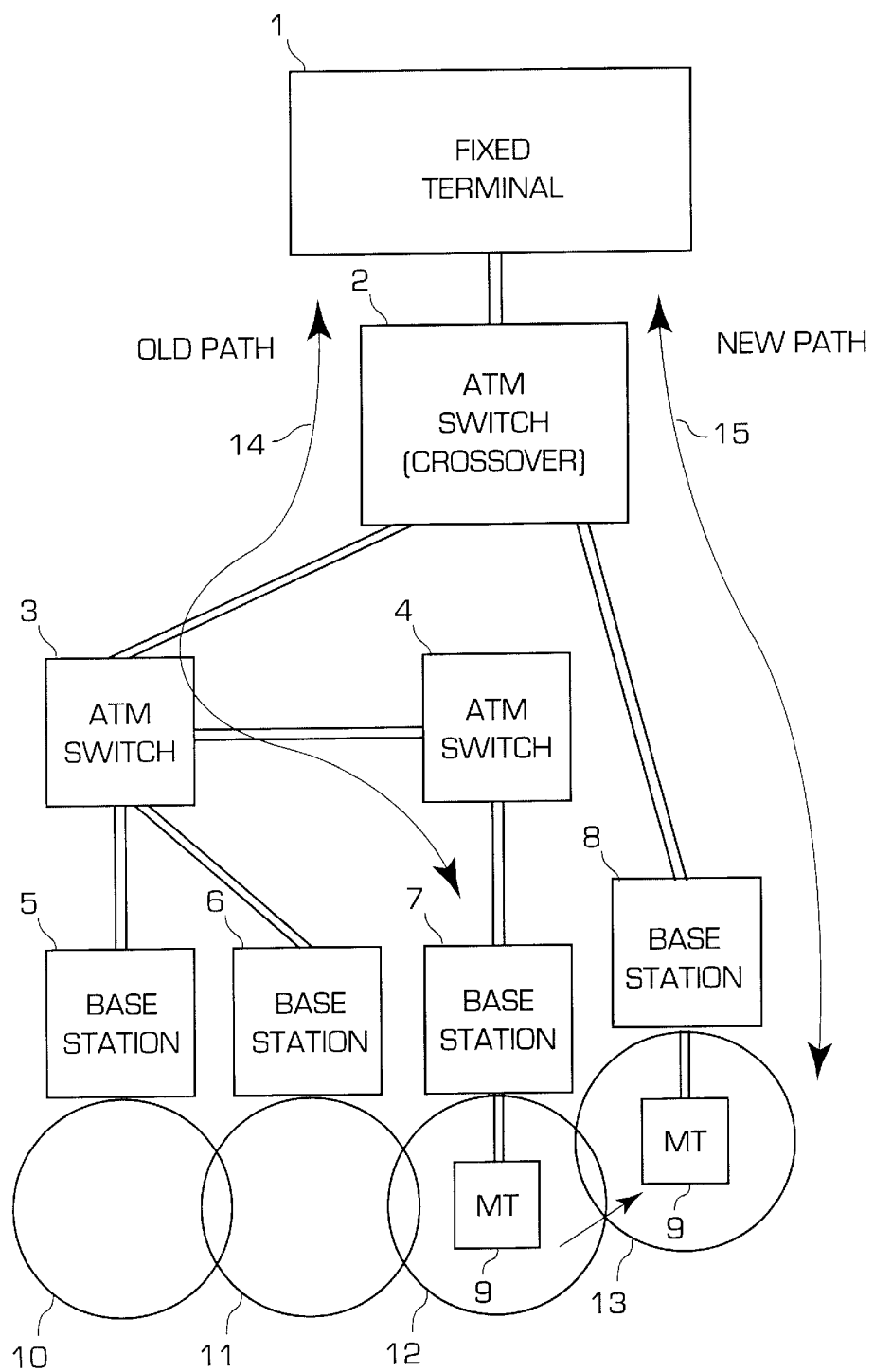
FIG. 1 is a diagram of a typical mobile ATM network architecture.
Figure 2:
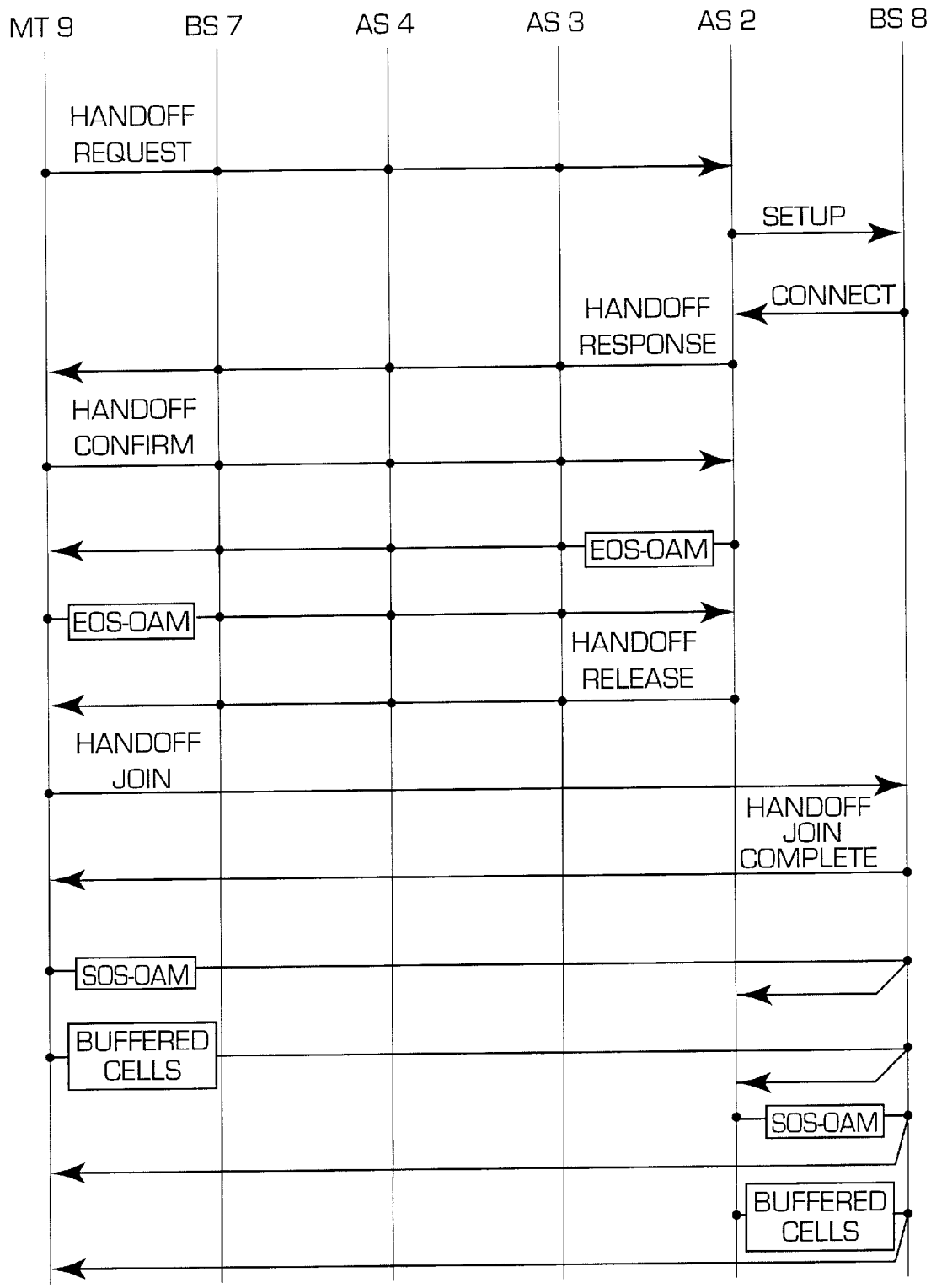
FIG. 2 describes the sequence of signals and cells in the handoff process of the preferred embodiment.
Figure 3A:
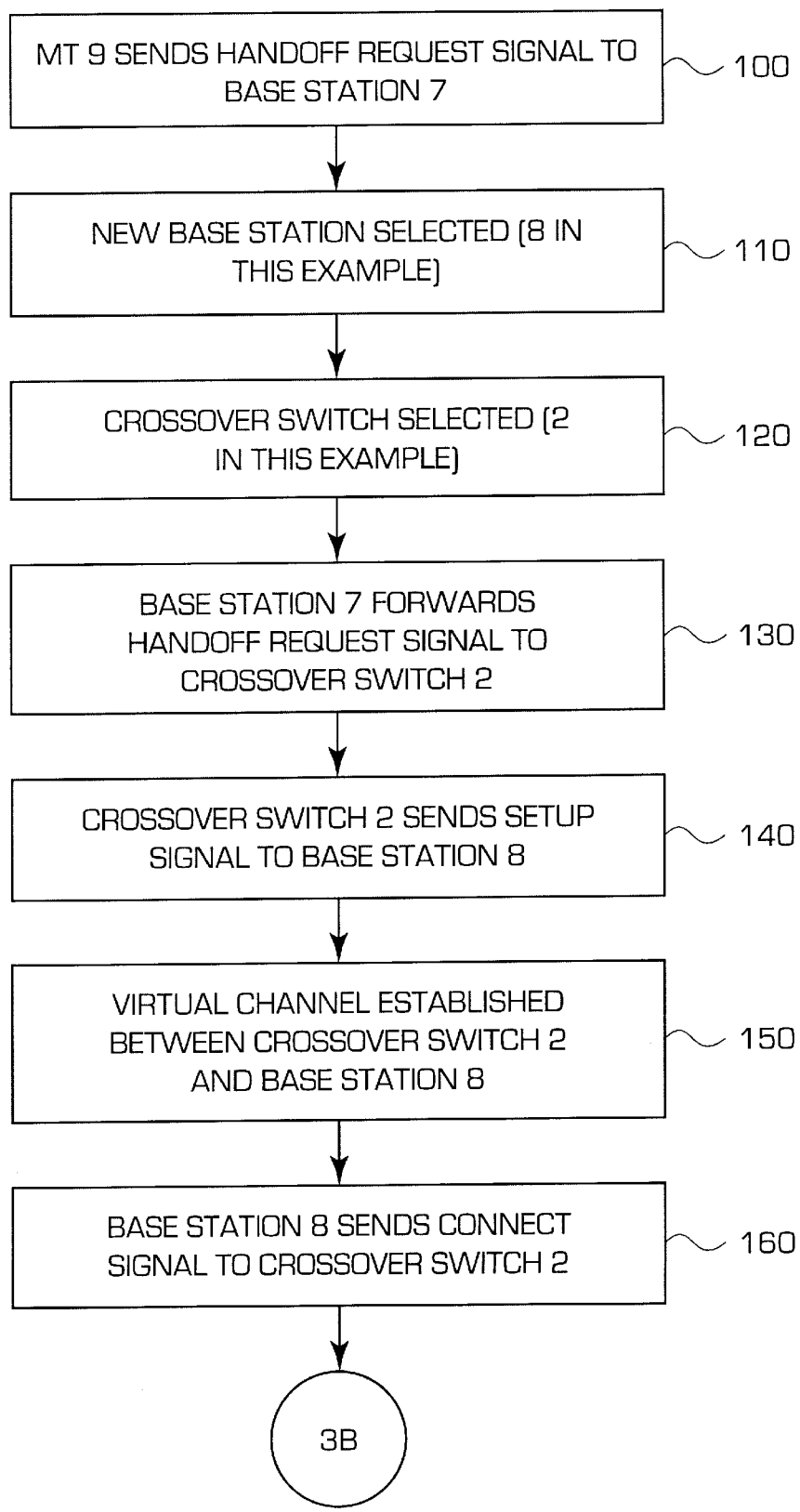
FIGS. 3A–3D contain a flowchart of the handoff process in the preferred embodiment.
Figure 3B:
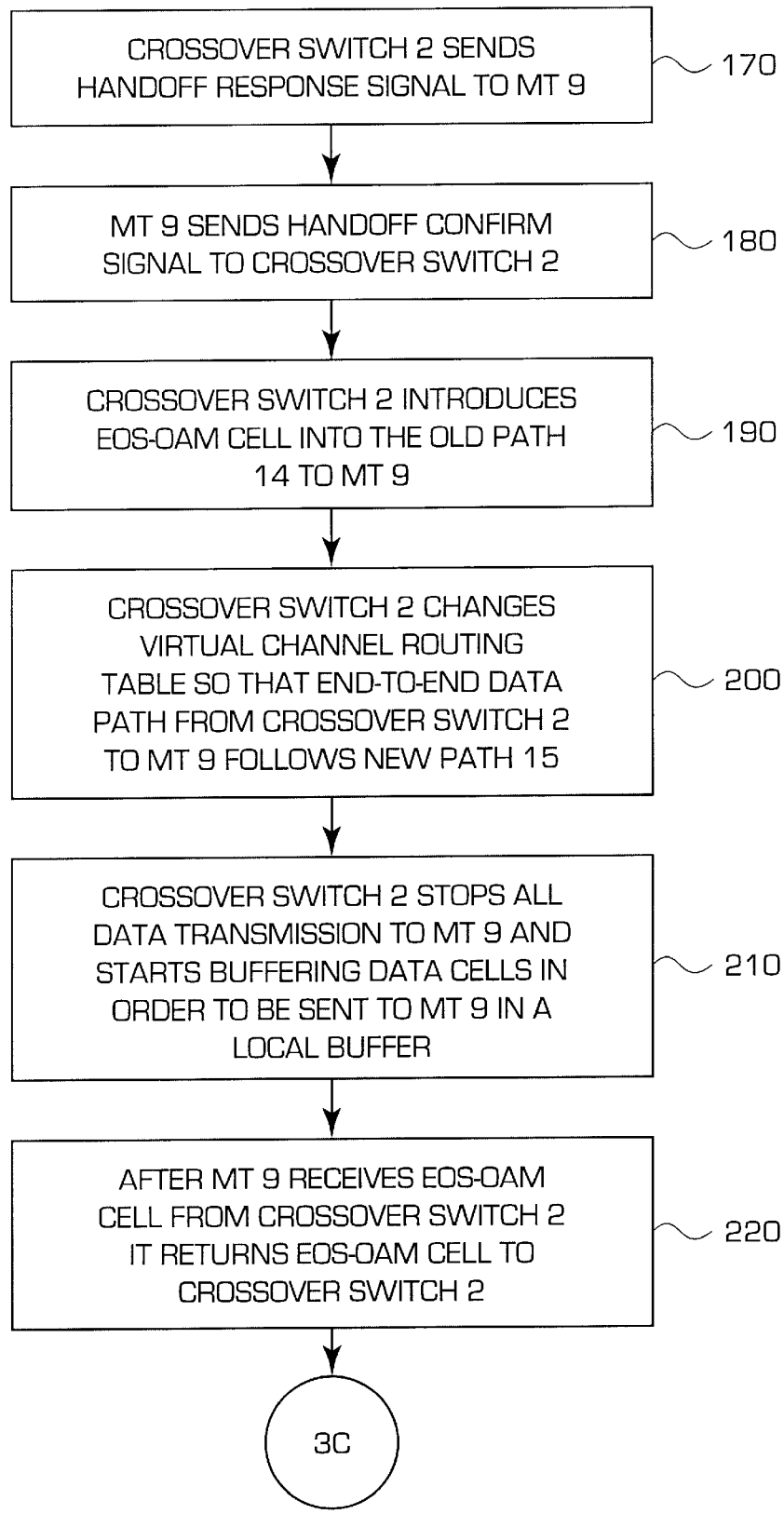
Figure 3C:
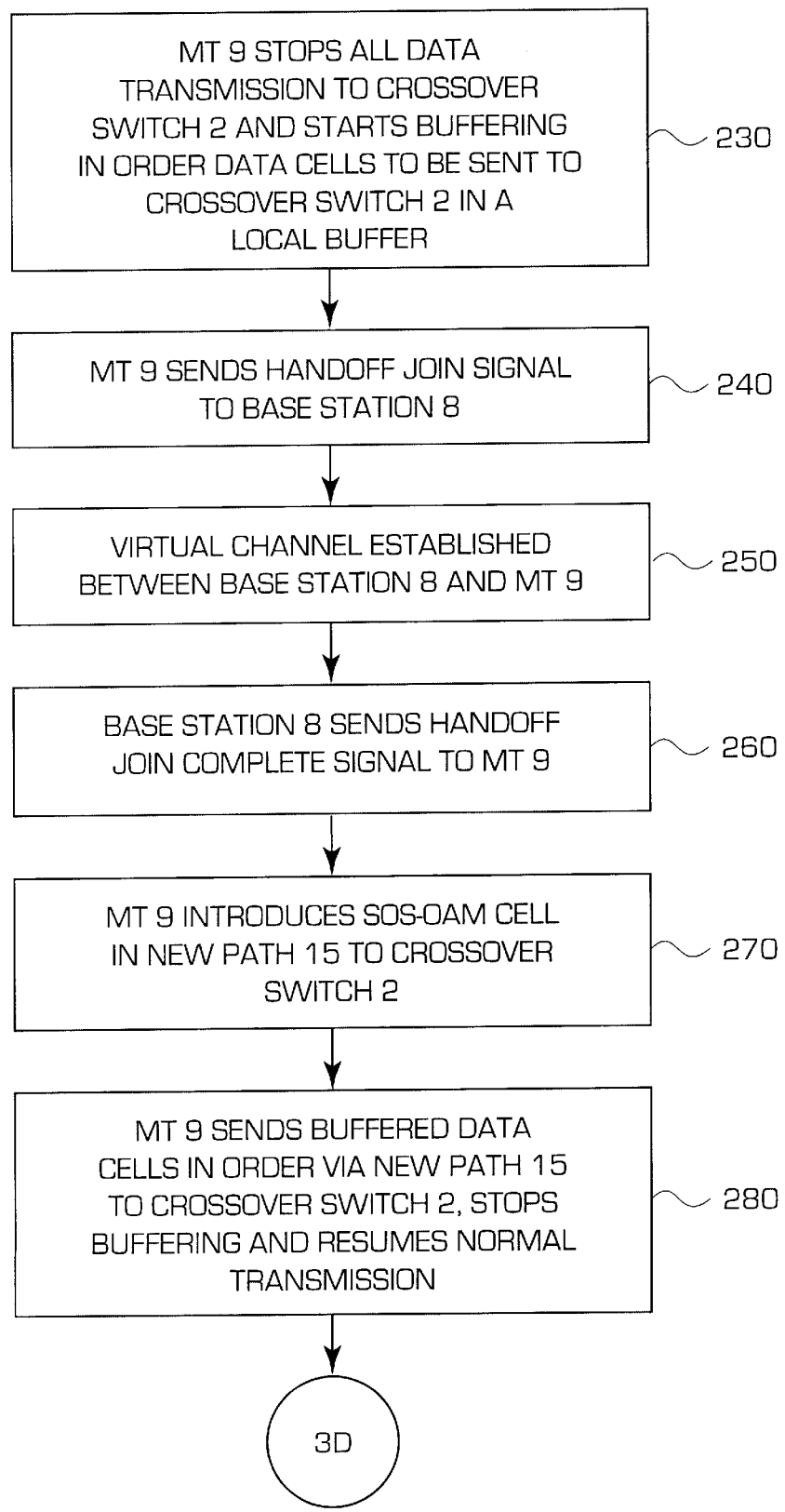
Figure 3D:
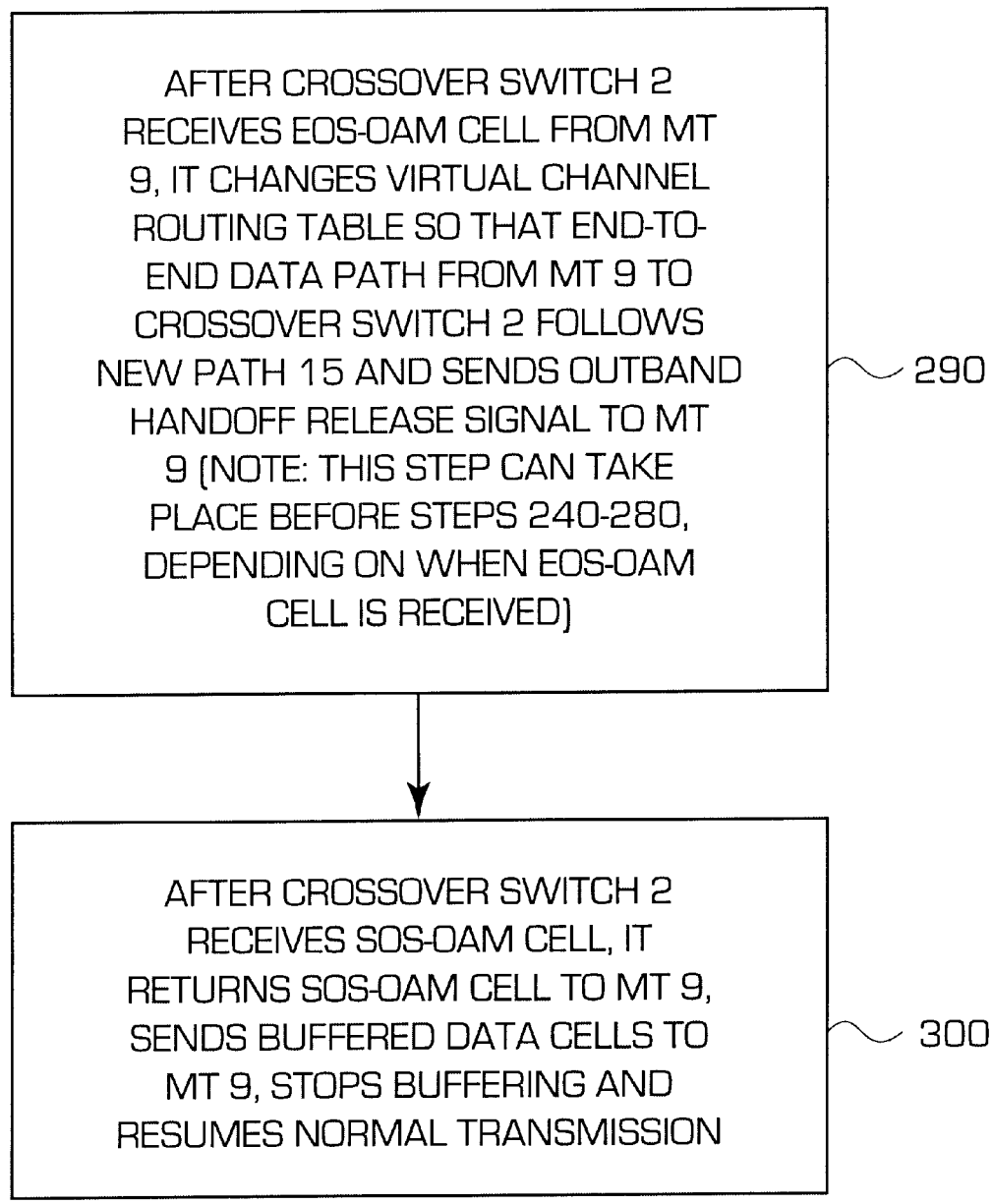
Figure 4A:
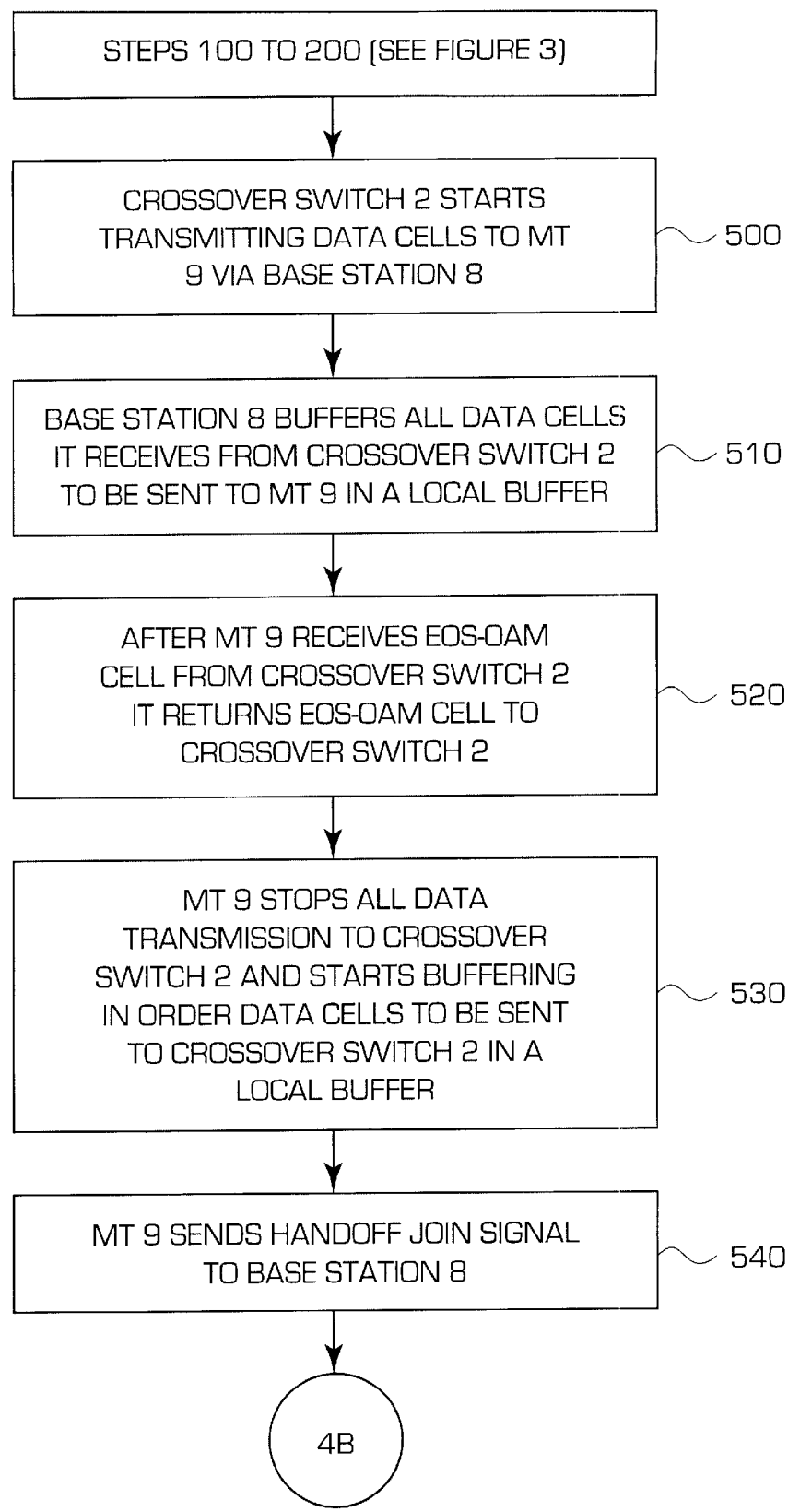
FIGS. 4A–4C contain a flowchart of the handoff process in an alternate embodiment.
Figure 4B:
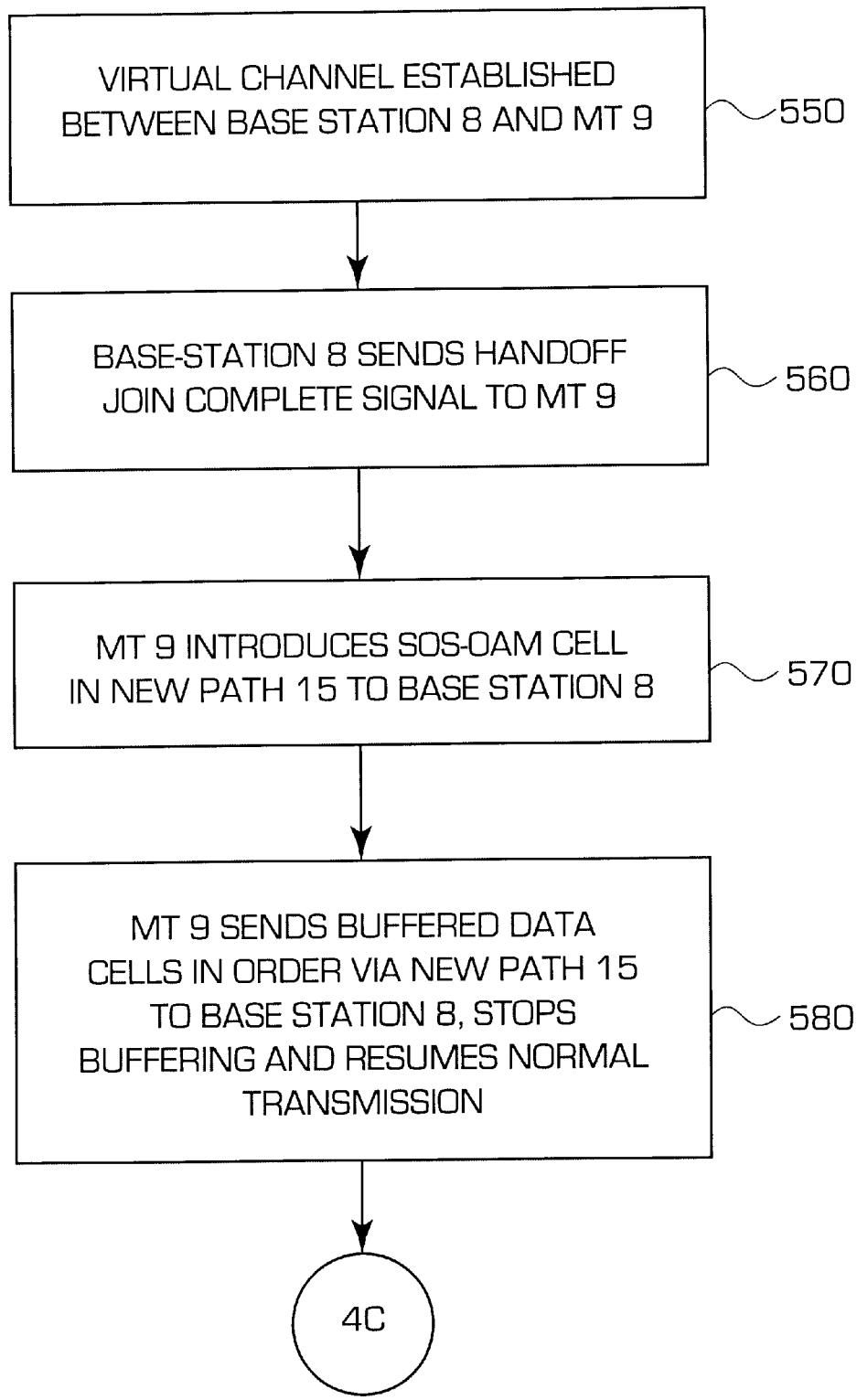
Figure 4C:
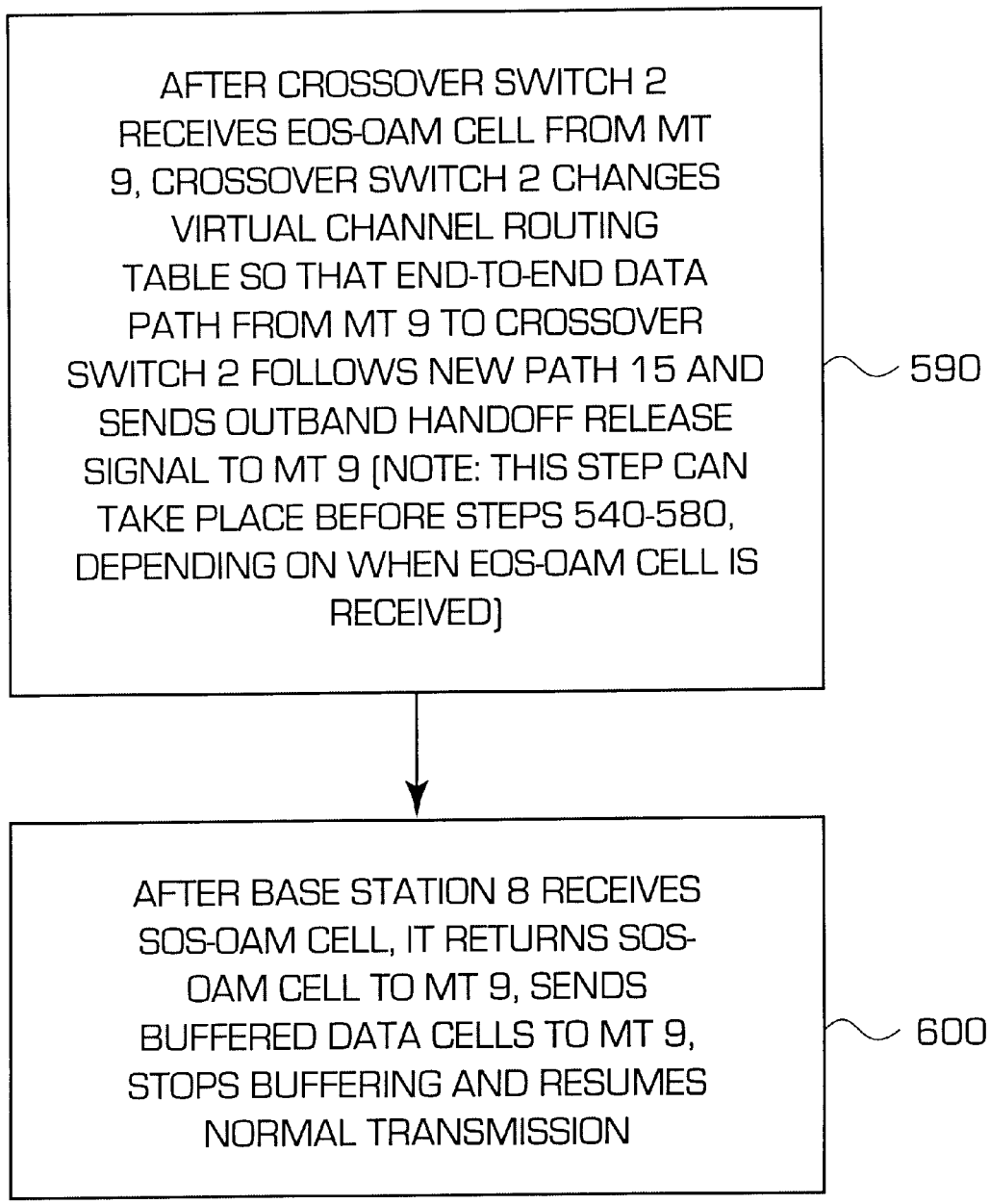

FIG. 1 is a diagram of a typical mobile ATM network architecture. It consists of fixed terminal 1, ATM switches 2, 3 and 4, radio port base stations 5, 6, 7 and 8, with corresponding coverage areas 10, 11, 12 and 13, and mobile terminal (MT) 9.

MT 9 is a complete ATM end system that is capable of supporting multimedia applications, such as an NEC Versa laptop with a wireless ATM card. An example of a wireless ATM card is described in an article by Cesar Johnston entitled, "A Network Interface Card for Wireless ATM Networks," Proceedings of IEEE PIMRC, 1996. This article is incorporated herein by reference. MT 9 uses a standard ATM signaling protocol (Q.2931, ATM forum UNI3.1) for connecting between end systems.

A typical base station is an ATM switch with a radio port for transmitting cells on the wireless link.

ATM switches 2, 3 and 4, such as 2.4 Gbps NEC model 5S running ATM Forum's UNI and NNI signalling, plus mobility extensions, are interconnected as shown via wireline links, with the exception of MT 9, which is interconnected to the network via a wireless link with the base stations.

The connections between the ATM switches, base stations and fixed terminal are standard ATM wireline links such as TAXI or SONET. The connection between MT 9 and base stations 7 and 8 are standard radio/wireless ATM links.

For purposes of describing the preferred embodiment, it is assumed that a virtual channel has been established between fixed terminal 1 and MT 9 via ATM switches 2, 3 and 4 and base station 7, via conventional means.

Next, the sequence of the handoff process will be described with reference to FIGS. 2 and 3A–3D. When MT 9 or base station 7 determines that a handoff is necessary, for example, when MT 9 starts to move outside coverage area 12 of base station 7 and into coverage area 13 of base station 8, MT 9 sends a proposed extended signaling message HANDOFF REQUEST signal to base station 7, requesting a connection handoff to another base station (step 100). Methods for choosing a new base station are well known in cellular telephone systems. For this example, it is assumed that base station 8 will be chosen as the new base station (step 110).

Next, an ATM switch that will act as a crossover switch is selected (step 120). The method for selecting the ATM switch to act as crossover switch is also not essential to this invention, however, a method for selecting a crossover switch is described in an article by C. K. Toh entitled, "Performance Evaluation of Crossover Switch Discovery for Wireless ATM LANs, Proceedings of Infocom, 1996. This article is incorporated herein by reference. For this example, it is assumed that ATM switch 2 will be chosen to act as the crossover switch. Base station 7 then forwards the HANDOFF REQUEST signal to crossover switch 2 (step 130).

After receiving the HANDOFF REQUEST signal, crossover switch 2 sends an outband SETUP signal to base station 8 (step 140). When a virtual channel is established between crossover switch 2 and base station 8, base station 8 sends an outband CONNECT signal to crossover switch 2 (steps 150, 160). Note that outband signals are sent on a separate signalling channel, while inband signals are typically operation and maintenance (OAM) cells sent along the connection path.

After receiving the CONNECT signal, crossover switch 2 sends an outband HANDOFF RESPONSE signal to MT 9 (step 170). MT 9 confirms the receipt of this signal by sending an outband HANDOFF CONFIRM signal to crossover switch 2 via base station 7 and switches 4 and 3 (step 180).

To achieve a zero cell-loss handoff, two requirements must be met: (1) cells in transit on the old path 14 (from crossover switch 2 to MT 9, via ATM switches 3 and 4 and base station 7) cannot not be lost; and (2) cells to be sent on the new path 15 (from MT 9 to crossover switch 2 via base station 8) must not be forwarded by MT 9 until MT 9 establishes link-layer connectivity to the new base station 8.

After crossover switch 2 receives the HANDOFF CONFIRM signal, it introduces an inband end-of-stream (EOS) operations and maintenance (OAM) cell into the old path 14 to MT 9 (step 190). This EOS-OAM in effect "flushes" all of the data cells that are in transit from crossover switch 2 to MT 9 on the old path 14, thus preventing the loss of data cells. Crossover switch 2 then changes its virtual channel routing table so that the end-to-end datapath from crossover switch 2 to MT 9 now follows the new path 15 (step 200). Crossover switch 2 also immediately stops all data cell transmission to MT 9 and starts buffering, in order, the data cells to be sent to MT 9 in a local buffer (step 210). This, in effect, releases the old path 14 in this direction for subsequent data cells, however, the old path 14 is still in place in the opposite direction from MT 9 to crossover switch 2 to accommodate incoming data cells from MT 9.

After MT 9 receives the EOS-OAM cell from crossover switch 2, it returns it to crossover switch 2 (step 220). MT 9 then immediately stops all transmission of data cells to crossover switch 2 and starts buffering, in order, the data cells to be sent to crossover switch 2 in a local buffer (step 230). The return trip of the EOS-OAM cell in effect "flushes" all of the data cells that are in transit from MT 9 to crossover switch 2 on the old path 14, thus preventing the loss of data cells.

After MT 9 returns the EOS-OAM cell to crossover switch 2, it sends an outband HANDOFF JOIN signal to base station 8 to establish a wireless connection and complete the new path 15 (step 240). After the connection is established, base station 8 sends a outband HANDOFF JOIN COMPLETE signal to MT 9 (steps 250, 260). MT 9 then sends an inband start-of-stream (SOS) OAM cell to crossover switch 2 over the new path 15 (step 270). MT 9 then sends the data cells it had been buffering, in a first in, first out order, stops buffering data cells and resumes normal transmission of data cells (step 280).

After crossover switch 2 receives the EOS-OAM from MT 9, it changes its virtual channel routing table so that the end-to-end datapath from MT 9 to crossover switch 2 now follows the new path 15 and sends an outband HANDOFF RELEASE signal to MT 9 which releases the old path 14 in this direction (step 290). Note that this step can take place before any of steps 240–280, depending on when crossover switch 2 receives the EOS-OAM cell.

After crossover switch 2 receives the SOS-OAM cell from MT 9, it returns it followed by the data cells it had been buffering, in a first in, first out order, stops buffering and resumes normal transmission of data cells (step 300). Note that transmission of the data cells crossover switch 2 receives from MT 9 after the SOS-OAM cell can not take place until after crossover switch 2 receives the EOS-OAM cell referred to in step 280. If this EOS-OAM cell has not yet been received, crossover switch 2 buffers, in order, the data cells it receives from MT 9 over the new path until the EOS-OAM is received, at which time the buffered cells can be released in a first in, first out order.

DESCRIPTION OF AN ALTERNATE EMBODIMENT

As an alternate embodiment, the buffering of data cells can be performed at the new base station 8 instead of at crossover switch 2. Refer to FIGS. 4A–4C and 5. In this embodiment, steps 100–200 of the handoff process remain the same (refer to FIGS. 3A–3D). The remaining steps differ from the process described above as follows.

After crossover switch 2 receives the EOS-OAM cell and changes its virtual channel routing table so that the end-to-end datapath from crossover switch 2 to MT 9 now follows the new path 15 (step 200), crossover switch 2 starts transmitting data cells to MT 9 via base station 8 (step 500). Base station 8 then starts buffering, in order, data cells to be sent to MT 9 in a local buffer (step 510).

After MT 9 receives the EOS-OAM cell from crossover switch 2, it returns the EOS-OAM cell to base station 8 via crossover switch 2 (step 520). MT 9 then immediately stops all transmission of data cells to crossover switch 2 and starts buffering, in order, data cells to be sent to crossover switch 2 in a local buffer (step 530). The return trip of the EOS-OAM cell in effect "flushes" all of the data cells that are in transit from MT 9 to crossover switch 2 on the old path 14, thus preventing the loss of data cells.

After MT 9 returns the EOS-OAM cell to base station 8, it sends an outband HANDOFF JOIN signal to base station 8 to establish a wireless connection and complete the new path 15 (step 540). After the connection is established, base station 8 sends an outband HANDOFF JOIN COMPLETE signal to MT 9 (steps 550, 560). MT 9 then introduces an inband start-of-stream (SOS) OAM cell to base station 8 over the new path 15 (step 570). MT 9 then sends the data cells it had been buffering, in a first in, first out order, stops buffering data cells and resumes normal transmission of data cells (step 580).

After crossover switch 2 receives the EOS-OAM from MT 9, it changes its virtual channel routing table so that the end-to-end datapath from MT 9 to crossover switch 2 now follows the new path 15 and sends an outband HANDOFF RELEASE signal to MT 9 which releases the old path 14 in this direction (step 590). Note that this step can take place before any of steps 540–580, depending on when crossover switch 2 receives the EOS-OAM cell.

After base station 8 receives the SOS-OAM cell from MT 9, it returns the data cells it had been buffering, in a first in, first out order, stops buffering and resumes normal transmission of data cells (step 300). Note that transmission of the data cells base station 8 receives from MT 9 after the SOS-OAM cell can not take place until after crossover switch 2 receives the EOS-OAM cell referred to in step 590. If this EOS-OAM cell has not yet been received, base station 8 buffers the data cells it receives from MT 9 over the new path until the EOS-OAM is received, at which time the buffered cells can be released in a first in, first out order.

While the above is a description of the invention in its preferred and alternate embodiments, various modifications and equivalents may be employed, only some of which have been described above. Therefore, the above description and illustration should not be taken as limiting the scope of the invention which is defined by the claims.

What is claimed is:

1. A method for mobile communication routing in a network including base stations, a mobile terminal, a fixed host, an ATM switch, with an established communication connection from a fixed host to said mobile terminal comprising the steps of:

(a) signaling from a mobile terminal to a first base station over an established communication connection when a hand-off is to occur;
    (b) selecting a second base station;
    (c) selecting an ATM switch to act as a crossover switch;
    (d) signaling from said first base station to said crossover switch over said established communication connection when said hand-off is to occur;
    (e) establishing a portion of a new communication connection from said crossover switch to said second base station;
    (f) stopping transmission of data from said crossover switch to said mobile terminal over said established communication connection and starting to buffer data in a data buffer in said crossover switch;
    (g) stopping transmission of data from said mobile terminal to said crossover switch over said established communication connection and starting to buffer data in a data buffer in said mobile terminal;
    (h) releasing said established communication connection;
    (i) establishing a remaining portion of said new communication connection from said mobile terminal to said second base station;
    (j) starting transmission of data from said mobile terminal to said crossover switch via said second base station and said new communication connection; and
    (k) starting transmission of data from said crossover switch to said mobile terminal through said second base station and over said new communication connection.

2. A method for mobile communication connections and routing in a network according to claim 1 wherein said step (e) comprises the steps of:

(e1) said crossover switch sending a setup signal to said new base station; and
    (e2) said new base station sending a connect signal to said crossover switch confirming establishment of said portion of said new communication connection.

3. A method for mobile communication connections and routing in a network according to claim 2 wherein said step (i) comprises the steps of:

(i1) said mobile terminal sending a handoff join signal to said new base station; and
    (i2) said new base station sending a handoff join complete signal to said mobile terminal confirming establishment of said remaining portion of said new communication connection.

4. A method for mobile communication connections and routing in a network according to claim 3 wherein said step (f) comprises the steps of:

(f1) said crossover switch sending an end-of-stream OAM cell to said mobile terminal via said established communication connection;
    (f2) said crossover switch changing a first entry in a virtual channel routing table such that further data transmission from said crossover switch to said mobile terminal will be over said new communication connection;
    (f3) said crossover switch stopping all data transmission to said mobile terminal and starting to buffer, in order, data in said crossover switch data buffer.

5. A method for mobile communication connections and routing in a network according to claim 4 wherein said step (g) comprises the steps of:

(g1) said mobile terminal returning said end-of-stream OAM cell to said crossover switch;
    (g2) said mobile terminal stopping all data transmission to said crossover switch and starting to buffer, in order, data in said mobile terminal data buffer.

6. A method for mobile communication connections and routing in a network according to claim S wherein said step (j) comprises the steps of:

(j1) said mobile terminal sending a start of stream OAM cell to said crossover switch over said new communication connection;
    (j2) said mobile terminal sending buffered data in first in, first out, order to said crossover switch over said new communication connection;

(j3) said mobile terminal stopping buffering of data; and (j4) said mobile terminal resuming normal data transmission.

7. A method for mobile communication connections and routing in a network according to claim 6 wherein said step (k) comprises the steps of:

(k1) after receiving said end of stream OAM cell, said crossover switch changing a second entry in said virtual channel routing table such that further data transmission from said mobile terminal to said crossover switch will be over said new communication connection;

(k2) said crossover switch returning said start of stream OAM cell to said mobile terminal;

(k3) said crossover switch sending buffered data in first in, first out, order to said mobile terminal over said new communication connection;

(k4) said crossover switch stopping buffering of data; and (k5) said crossover switch resuming normal data transmission.

8. A method for mobile communication routing in a network including base stations, a mobile terminal, a fixed host, an ATM switch, with an established communication connection from a fixed host to said mobile terminal comprising the steps of:

(a) signaling from a mobile terminal to a first base station over an established communication connection when a hand-off is to occur;

(b) selecting a second base station;

(c) selecting an ATM switch to act as a crossover switch;

(d) signaling from said first base station to said crossover switch over said established communication connection when said hand-off is to occur;

(e) establishing a portion of a new communication connection from said crossover switch to said second base station;

(f) stopping transmission of data from said crossover switch to said mobile terminal over said established communication connection and starting to buffer data in a data buffer in said second base station;

(g) stopping transmission of data from said mobile terminal to said crossover switch over said established communication connection and starting to buffer data in a data buffer in said mobile terminal;

(h) releasing said established communication connection;

(i) establishing a remaining portion of said new communication connection from said mobile terminal to said second base station;

(j) starting transmission of data from said mobile terminal to said crossover switch via said second base station and said new communication connection; and (k) starting transmission of data from said crossover switch to said mobile terminal through said second base station and over said new communication connection.

9. A method for mobile communication connections and routing in a network according to claim 8 wherein said step (e) comprises the steps (e1) said crossover switch sending a setup signal to said new base station; and (e2) said new base station sending a connect signal to said crossover switch confirming establishment of said portion of said new communication connection.

10. A method for mobile communication connections and routing in a network according to claim 9 wherein said step (i) comprises the steps of:

(i1) said mobile terminal sending a handoff join signal to said new base station; and (i2) said new base station sending a handoff join complete signal to said mobile terminal confirming establishment of said remaining portion of said new communication connection.

11. A method for mobile communication connections and routing in a network according to claim 10 wherein said step (f) comprises the steps of:

(f1) said crossover switch sending an end of stream OAM cell to said mobile terminal via said established communication connection;

(f2) said crossover switch changing a first entry in a virtual channel routing table such that further data transmission from said crossover switch to said mobile terminal will be over said new communication connection;

(f3) said crossover switch starting to transmit all data transmission to said mobile terminal to said second base station;

(f4) said second base station starting to buffer, in order, data in said second base station data buffer.

12. A method for mobile communication connections and routing in a network according to claim 11 wherein said step (g) comprises the steps of:

(g1) said mobile terminal returning said end-of-stream OAM cell to said second base station via said crossover switch;

(g2) said mobile terminal stopping all data transmission to said crossover switch and starting to buffer, in order, data in said mobile terminal data buffer.

13. A method for mobile communication connections and routing in a network according to claim 12 wherein said step (j) comprises the steps of:

(j1) said mobile terminal sending a start-of-stream OAM cell to said second base station;

(j2) said mobile terminal sending buffered data in first in, first out, order to said second base station;

(j3) said mobile terminal stopping buffering of data; and (j4) said mobile terminal resuming normal data transmission.

14. A method for mobile communication connections and routing in a network according to claim 13 wherein said step (k) comprises the steps of:

(k1) after receiving said end of stream OAM cell, said crossover switch changing a second entry in said virtual channel routing table such that further data transmission from said mobile terminal to said crossover switch will be over said new communication connection;

(k2) said second base station returning said start of stream OAM cell to said mobile terminal;

(k3) said second base station sending buffered data in first in, first out, order to said mobile terminal over said new communication connection;

(k4) said second base station stopping buffering of data; and (k5) said second base station switch resuming normal data transmission.

* * * * *